J. F. O'CONNOR.
ANTIFRICTION SIDE BEARING FOR RAILWAY CARS.
APPLICATION FILED MAY 8, 1908.
909,107.
Patented Jan. 5, 1909.
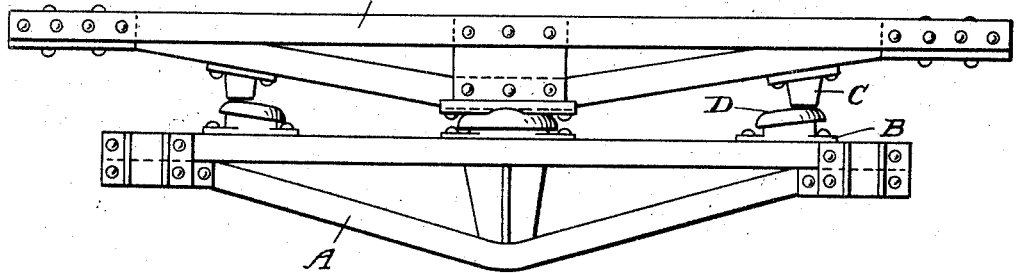
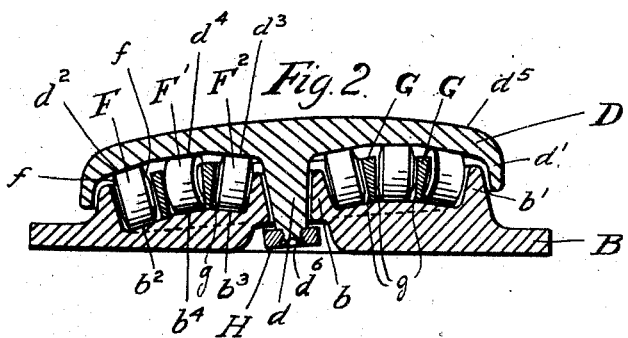
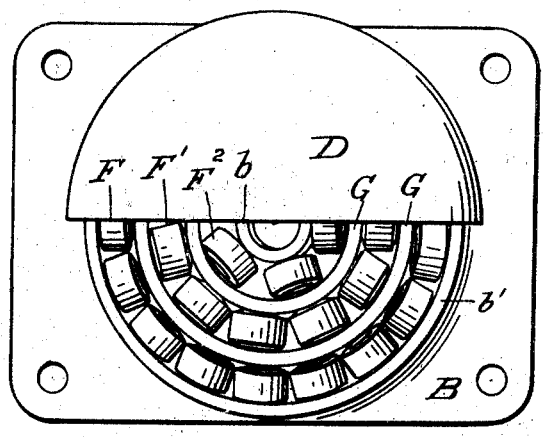
WITNESSES:
F. B. Townsend
W. M. Munday
INVENTOR
John F. O'Connor
BY
Munday, Evarts, Adcock & Clarke.
*his* ATTORNEYS

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

ANTIFRICTION SIDE BEARING FOR RAILWAY-CARS.

No. 909,107.  Specification of Letters Patent.  Patented Jan. 5, 1909.

Application filed May 8, 1908. Serial No. 431,659.

To all whom it may concern:

Be it known that I, JOHN F. O'CONNOR, a citizen of the United States, residing in Chicago, in the county of Cook and State of Illinois, have invented a new and useful Improvement in Antifriction Side Bearings for Railway-Cars, of which the following is a specification.

My invention relates to anti-friction side bearings for railway cars.

In anti-friction railway side bearings of the kind heretofore commonly in use, difficulty is experienced and inefficient operation occasioned by reason of the fact that the rollers interposed between the upper and lower side bearing plates do not materially operate to reduce the friction due to the side thrust or lateral thrust of the train in rounding curves.

My invention consists in the means I employ to practically accomplish this object or result. That is to say, it consists in connection with upper and lower side bearing plates, the former secured to the body bolster and the latter secured to the truck bolster, of an interposed rotatable disk journaled to rotate upon the lower side bearing plate, said lower side bearing plate being provided with a plurality of oppositely or differently inclined annular treads and the rotatable disk having also a plurality of differently inclined annular treads, and a plurality of sets of anti-friction rollers interposed between the several annular treads of the lower bearing plate and the rotatable disk.

The invention further consists in the novel construction of parts and devices and in the novel combinations of parts and devices herein shown and described.

In the accompanying drawing forming a part of this specification, Figure 1 is a front elevation of a car truck and body bolster provided with my improved anti-friction side bearings. Fig. 2 is a central vertical longitudinal section through one of the side bearings, and Fig. 3 is a plan view partly broken away.

In the drawing, A represents the truck bolster and $A^1$ the body bolster.

B is the lower bearing plate secured to the truck bolster, C the upper bearing plate secured to the body bolster, D the interposed rotatable disk journaled upon the lower bearing plate F $F^1$ $F^2$ anti-friction rollers interposed between said rotatable disk and the lower bearing plate and G loose separating rings placed between the several sets or series of anti-friction rollers.

The lower bearing plate B, which is secured to the truck bolster, is provided with an annular hub $b$, the axis of which is somewhat inclined from the vertical towards the center of the car, and with an annular rim $b^1$. Between the annular hub $b$ and rim $b^1$ the lower bearing plate B is furnished with a plurality of differently or oppositely inclined annular treads $b^2$ and $b^3$, and also preferably with an intermediate annular tread $b^4$.

The interposed rotatable disk D has a central stud or hub $d$, preferably of conical shape, fitting within the annular hub $b$ of the lower side bearing plate B, and it is also provided with an outer marginal rim $d^1$ which embraces or telescopes over the annular rim $b^1$ of the lower side bearing plate B. The rotatable disk D is further provided with two oppositely inclined annular treads $d^2$ $d^3$, and preferably also with an intermediate annular tread $d^4$, these annular treads being preferably parallel to the annular treads $b^2$ $b^3$ $b^4$ of the lower bearing plate B.

The upper bearing face $d^5$ of the rotatable disk D is preferably rounded or curved about as indicated in Fig. 2, and the lower bearing plate B and rotatable disk D are so arranged and combined with the upper side bearing C on the body bolster that said side bearing C contacts with the rotatable disk D only at the portion thereof outside of its axis or pivot stud or hub $d$, as will be readily understood from Fig. 1 of the drawing. As the axis of the rotatable disk D is inclined to the vertical, the disk D is also of course inclined to the horizontal.

The rotatable disk D is preferably secured to the lower bearing plate B by a connecting ring H which is applied to the central stud $d$ of said disk D after the parts are assembled and secured in place by a riveting or clenching flange $d^6$ which is bent over the connecting ring H or upset in respect thereto.

As the annular treads $b^2$ $b^3$ and $d^2$ $d^3$ of the plate B and disk D are oppositely inclined, the two sets of rollers F and $F^2$ have their axes oppositely inclined and serve to effectually and anti-frictionally resist the side thrust of the train in rounding curves, as well as to anti-frictionally resist the weight or direct downward load of the car on the side bearings. The intermediate set of rollers $F^1$ coöperate with the sets of rollers F and $F^2$, affording an anti-friction bearing under the weight or downward load of the car.

The rings G fit loosely between the several sets of rollers $F\ F^1\ F^2$. These rings are preferably made wedging in cross section so that their faces $g$ may be more nearly at right angles to the axes of the differently inclined rollers $F\ F^1\ F^2$. The rollers $F\ F^1\ F^2$ are each preferably furnished with rounded beveled or tapering end faces $f$ to diminish their contacting bearing against the separating rings G and the faces of the rim $b^1$ on the hub $b$.

I claim:—

1. The combination with car truck and body bolsters, of lower side bearing plates secured to the truck bolster, upper side bearing plates secured to the body bolster, interposed rotatable inclined disks journaled on the lower side plates with their axes inclined to the vertical, each of said lower side plates and each of said rotatable disks having a plurality of differently inclined annular treads, and a plurality of sets of anti-friction rollers, substantially as specified.

2. The combination with car truck and body bolsters, of lower side bearing plates secured to the truck bolster, upper side bearing plates secured to the body bolster, interposed rotatable inclined disks journaled on the lower side plates with their axes inclined to the vertical, each of said lower side plates and each of said rotatable disks having a plurality of differently inclined annular treads, and a plurality of sets of anti-friction rollers, and separating rings between the different sets of anti-friction rollers, substantially as specified.

3. The combination with car truck and body bolsters, of lower side bearing plates secured to the truck bolster, upper side bearing plates secured to the body bolster, interposed rotatable inclined disks journaled on the lower side plates with their axes inclined to the vertical, each of said lower side plates and each of said rotatable disks having a plurality of differently inclined annular treads and a plurality of sets of anti-friction rollers, and separating rings between the different sets of anti-friction rollers, each of said lower side bearing plates having a central hub and a rim, and each of said rotatable disks having a coöperating central hub and rim, substantially as specified.

4. In a side bearing, the combination with the upper and lower side bearing plates, of an inclined rotatable disk journaled on the lower side bearing plate, said lower side bearing plate and said rotatable disk having each two oppositely inclined annular treads and two different sets of rollers interposed between said treads, substantially as specified.

5. In a side bearing, the combination with the upper and lower side bearing plates, of an inclined rotatable disk journaled on the lower side bearing plate, said lower side bearing plate and said rotatable disk having each two oppositely inclined annular treads, and two different sets of rollers interposed between said treads, said lower side bearing plate and said rotatable disk having also an intermediate annular tread and an intermediate set of anti-friction rollers, substantially as specified.

6. The combination with a lower bearing plate having a plurality of differently inclined annular treads, a rotatable disk journaled thereon with its axis at an inclination to the vertical, and provided with a plurality of differently inclined annular treads and a plurality of sets of anti-friction rollers, substantially as specified.

7. The combination with a lower bearing plate having a plurality of differently inclined annular treads, a rotatable disk journaled thereon with its axis at an inclination to the vertical, and provided with a plurality of differently inclined annular treads and a plurality of sets of anti-friction rollers, and a loose separating ring between adjacent sets of anti-friction rollers, substantially as specified.

8. The combination with a lower bearing plate having a plurality of differently inclined annular treads, a rotatable disk journaled thereon with its axis at an inclination to the vertical, and provided with a plurality of differently inclined annular treads and a plurality of sets of anti-friction rollers, and a loose separating ring between adjacent sets of anti-friction rollers, said lower bearing plate having an annular hub and an annular rim, and said rotatable disk having an annular rim and a central stud, substantially as specified.

9. The combination with a lower bearing plate having a plurality of differently inclined annular treads, a rotatable disk journaled thereon with its axis at an inclination to the vertical, and provided with a plurality of differently inclined annular treads and a plurality of sets of anti-friction rollers, and a loose separating ring between adjacent sets of anti-friction rollers, said lower bearing plate having an annular hub and an annular rim, and said rotatable disk having an annular rim and a central stud, said central stud of said rotatable disk being provided with a connecting ring, substantially as specified.

JOHN F. O'CONNOR.

Witnesses:
H. M. MUNDAY,
EDMUND ADCOCK.